United States Patent
Kim et al.

(10) Patent No.: US 12,145,652 B2
(45) Date of Patent: Nov. 19, 2024

(54) VEHICLE TRUSS MEMBER

(71) Applicants: Hyundai Motor Company, Seoul (KR); Kia Corporation, Seoul (KR)

(72) Inventors: Ho Yeon Kim, Daegu (KR); Seok Ju Gim, Seongnam-si (KR); Ji Ae Yong, Hwaseong-si (KR); Won Oh Kim, Ansan-si (KR); Chul Hee Heo, Hwaseong-si (KR); Tae Gyu Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 271 days.

(21) Appl. No.: 17/895,270

(22) Filed: Aug. 25, 2022

(65) Prior Publication Data

US 2023/0174161 A1   Jun. 8, 2023

(30) Foreign Application Priority Data

Dec. 2, 2021   (KR) .................. 10-2021-0171032

(51) Int. Cl.
| | |
|---|---|
| *B62D 27/02* | (2006.01) |
| *B62D 23/00* | (2006.01) |
| *B62D 65/04* | (2006.01) |

(52) U.S. Cl.
CPC ......... *B62D 23/005* (2013.01); *B62D 27/023* (2013.01); *B62D 65/04* (2013.01)

(58) Field of Classification Search
CPC ...... B62D 23/005; B62D 25/00; B62D 65/04; B62D 27/023; B62D 27/065
USPC .............................. 296/205, 29, 30; 280/800
See application file for complete search history.

(56) References Cited

U.S. PATENT DOCUMENTS

| | | | | |
|---|---|---|---|---|
| 2,993,728 | A * | 7/1961 | Beran | B62D 53/06 280/407.1 |
| 5,028,072 | A * | 7/1991 | Lindsay | E04B 5/14 280/789 |
| 6,318,775 | B1 * | 11/2001 | Heatherington | B60R 19/18 293/154 |
| 6,746,038 | B2 * | 6/2004 | McCoy | B60D 1/485 280/495 |
| 6,926,350 | B2 * | 8/2005 | Gabbianelli | B62D 21/11 296/187.11 |
| 7,021,646 | B1 * | 4/2006 | Cheng | B60D 1/485 280/495 |
| 8,262,151 | B2 * | 9/2012 | De Queiroz | B60R 19/34 296/187.01 |
| 11,097,779 | B2 | 8/2021 | Baccouche et al. | |
| 2013/0020781 | A1 * | 1/2013 | Kishikawa | B62K 19/06 280/281.1 |
| 2021/0171110 | A1 | 6/2021 | Heo et al. | |
| 2021/0171114 | A1 | 6/2021 | Mo et al. | |

FOREIGN PATENT DOCUMENTS

| | | |
|---|---|---|
| KR | 20210070806 A | 6/2021 |
| KR | 20210070808 A | 6/2021 |
| KR | 20210071182 A | 6/2021 |

* cited by examiner

*Primary Examiner* — Dennis H Pedder
(74) *Attorney, Agent, or Firm* — Slater Matsil, LLP (57) ABSTRACT

An embodiment vehicle truss member includes a member body having a pipe shape having an open end and an end patch coupled to the open end of the member body to close the open end of the member body, the end patch including a coupling part configured to be selectively coupled to an external element.

20 Claims, 6 Drawing Sheets

VEHICLE TRUSS MEMBER

CROSS-REFERENCE TO RELATED APPLICATIONS

This application claims the benefit of Korean Patent Application No. 10-2021-0171032, filed on Dec. 2, 2021, which application is hereby incorporated herein by reference.

TECHNICAL FIELD

The present disclosure relates to a technology regarding a vehicle truss member.

BACKGROUND

Conventional chassis structures have shortcomings in that investment is necessary in large-scale facilities such as a press factory, a chassis welding factory, and a painting factory because chassis are produced by processing and welding components through press processing that uses molds, and the degree of freedom is low in connection with design.

Particularly, existing chassis require frequent design changes when multiple types are produced in small amounts, and the number of necessary molds increases exponentially, thereby posing a problem of increased production costs.

It has recently become necessary to simplify vehicle production and to minimize the development period in order to respond to rapidly changing market environments and customer needs in a timely manner.

Therefore, there is a need for a chassis structure which can respond to various designs, and which has improved chassis assembly characteristics in a smart factory environment.

In addition, there is a need for a vehicle capable of transporting cargo without a driver in the vehicle in line with recent development of autonomous driving technologies, and there is a need for a vehicle which can be manufactured in an eco-friendly smart factory, wherein when the autonomous driving vehicle requiring no driver is manufactured, some components are modularized to reduce costs and to simplify manufacturing, and the chassis is assembled solely by mechanically assembling the modularized vehicle components, such as bolting, without going through a press process, a chassis welding process, and a painting process.

The above descriptions regarding background technologies have been made only to aid in understanding of the background of the present disclosure, and are not to be deemed by those skilled in the art to correspond to already known prior art.

SUMMARY

The present disclosure relates to a technology regarding a vehicle truss member. Particular embodiments relate to a technology regarding a chassis structure of a vehicle driven for a purpose such as cargo transportation, mobile market, or the like. Exemplary embodiments relate to a chassis frame structure for simplifying vehicle manufacturing.

Embodiments of the present disclosure can solve problems in the prior art, and an embodiment of the present disclosure provides a simplified manufacturing process wherein, when a chassis is manufactured by coupling multiple pipes to each other, coupling members are coupled to the multiple pipes such that the pipes are easily coupled by coupling processes such as bolting or riveting, and the coupling members are welded to the pipes while maintaining a distance inside the pipes, thereby making it unnecessary to remove welding beads.

A vehicle truss member according to embodiments of the present disclosure, a plurality of which are connected to form a chassis having a vehicle truss structure, may include a member body extending to have a pipe shape and having an end opened in the extension direction and an end patch coupled to the open end of the member body to close the end of the member body and having a coupling part selectively fastened to an external element.

The member body may have a through-hole formed therethrough in a direction intersecting with the member body so as to be coupled to an external element, and may be connected to a coupling part of another end patch through a bolt or nut coupled to the through-hole.

The end patch may be welded to the member body to be spaced inward from the end thereof, and a bead formed by the welding may be positioned in a distancing space formed by the end patch being spaced toward the inside of the member body.

The coupling part may protrude to the outside further than the end of the member body, and may be coupled to an external element to be in surface contact therewith.

The coupling part may include a coupling hole formed therethrough, and may be coupled to an external element by bolting or riveting through the coupling hole.

A bolt, a nut, or a rivet may be welded to the coupling hole to correspond thereto and may be coupled to an external element by bolting or riveting.

One side surface of the member body may be opened in the longitudinal direction, and the end of an open portion of the member body may protrude to surround the end patch.

A vehicle truss member according to embodiments of the present disclosure is advantageous in that a member body is provided in the shape of a pipe having an open end, an end patch that can be mechanically coupled (for example, by bolting or riveting) to an external element is coupled to the end of the member body so as to close the end and is modularized, and, since the chassis is manufactured simply by mechanically coupling the external element and the member body, the vehicle can be completed simply by mechanically coupling (for example, by bolting or riveting) modularized vehicle components through an eco-friendly smart factory production scheme without a press process, a chassis welding process, and a painting process.

BRIEF DESCRIPTION OF THE DRAWINGS

The above and other aspects, features and advantages of embodiments of the present disclosure will be more apparent from the following detailed description taken in conjunction with the accompanying drawings, in which.

DETAILED DESCRIPTION OF ILLUSTRATIVE EMBODIMENTS

A specific structural or functional description of embodiments of the present disclosure set forth in the specification or application is given merely for the purpose of describing the embodiments according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

In the case where an element is referred to as being "connected" or "coupled" to other elements, it should be understood that not only the element is directly connected or coupled to the other elements, but also another element may exist between them. Contrarily, in the case where a component is referred to as being "directly connected" or "directly coupled" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. Similar or like reference signs presented in the respective drawings designate similar or like elements.

Conventional vehicles require a relatively long manufacturing process and manufacturing costs to provide all of the suspension, exterior, interior, steering device, and safety devices to a vehicle in consideration of passenger boarding, ride comfort, safety specifications, beauty of external appearance, and driving performance, etc. In addition, individual vehicles need to be manufactured for each purpose, but there is a problem in that customized vehicles to suit all the purposes cannot be manufactured.

The vehicle to which the technology according to embodiments of the present disclosure is applied is associated with a business vehicle for various commercial purposes, such as logistics, food trucks, delivery, and service provision in connection with a purpose built vehicle (PBV). The illustrated embodiments show a vehicle, as a representative case, which transports cargo loaded in the interior space thereof without passenger boarding, may be driven through an autonomous driving system, and thus may be used for an unmanned delivery/logistics/delivery system of cargo, food, or the like.

The vehicle according to embodiments of the present disclosure can be simply designed and manufactured due to a simple structure thereof. In the vehicle, components of the vehicle are modularized and shared so that the costs are reduced and component supply is facilitated. The modularized vehicle components can complete a vehicle only by mechanical coupling such as bolting or riveting through an eco-friendly smart factory production method dispensing with a press process, a welding process of a chassis, and a painting process.

Embodiments of the present disclosure relate to a method for manufacturing a chassis through a plurality of pipes to simplify the manufacturing process, exclude the welding process as much as possible, and reduce the manufacturing cost of a chassis member. However, the pipe can be manufactured through extrusion or roll forming and thus can advantageously lower costs, but reinforcement of the coupling strength is required when the pipe is coupled to a pipe or other panels. Therefore, embodiments of the present disclosure include a coupling member applied to close an open end of the pipe so that the end of the pipe can be strongly coupled to another pipe or panel. The coupling member suppresses the deformation of the open end of the pipe and includes a coupling surface provided to allow the coupling member to be coupled to other elements. The specific configuration of the coupling member will be described later. A structure in which a pipe and a coupling member are integrated with each other, according to embodiments of the present disclosure, enables easy assembly of a chassis only through mechanical coupling such as bolting or riveting in an eco-friendly smart factory. In addition, the structure does not require welding, etc. and thus is eco-friendly. Furthermore, the structure enables easy replacement for some members of the chassis in the event of an accident or maintenance and enables easy assembly and production of various types of vehicle models.

Hereinafter, embodiments of the present disclosure relate to a configuration of a coupling member designed to connect a plurality of pipes to each other.

Figure 1:
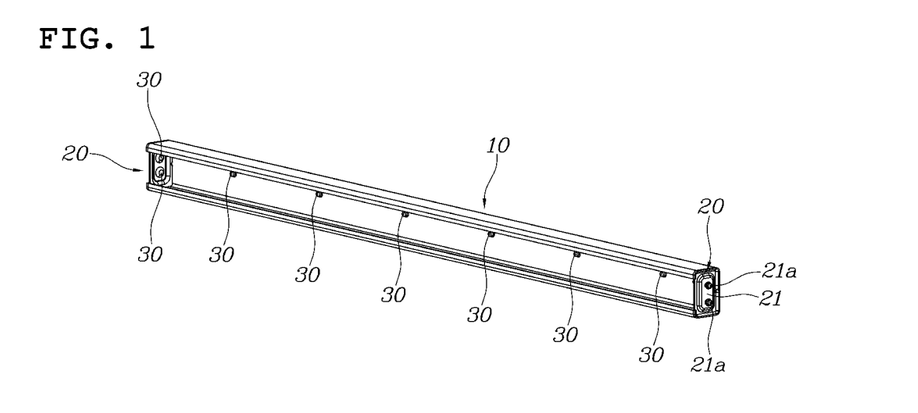
FIG. 1 is a perspective view of a member body and an end patch of a vehicle truss member according to an embodiment of the present disclosure.
Figure 2:
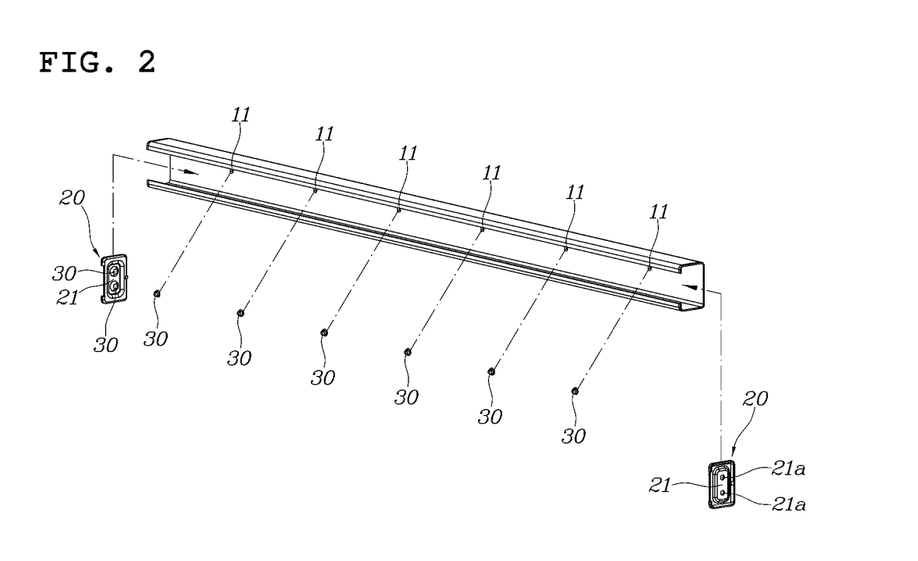
FIG. 2 is an exploded perspective view of FIG. 1.
Figure 3:
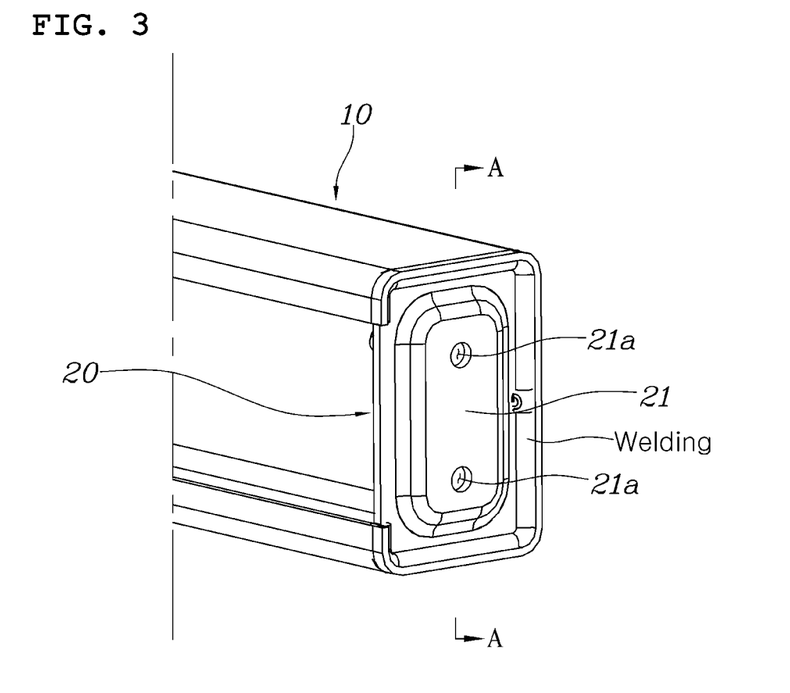
FIG. 3 is an enlarged view of an end patch of a vehicle truss member according to an embodiment of the present disclosure.
Figure 4:
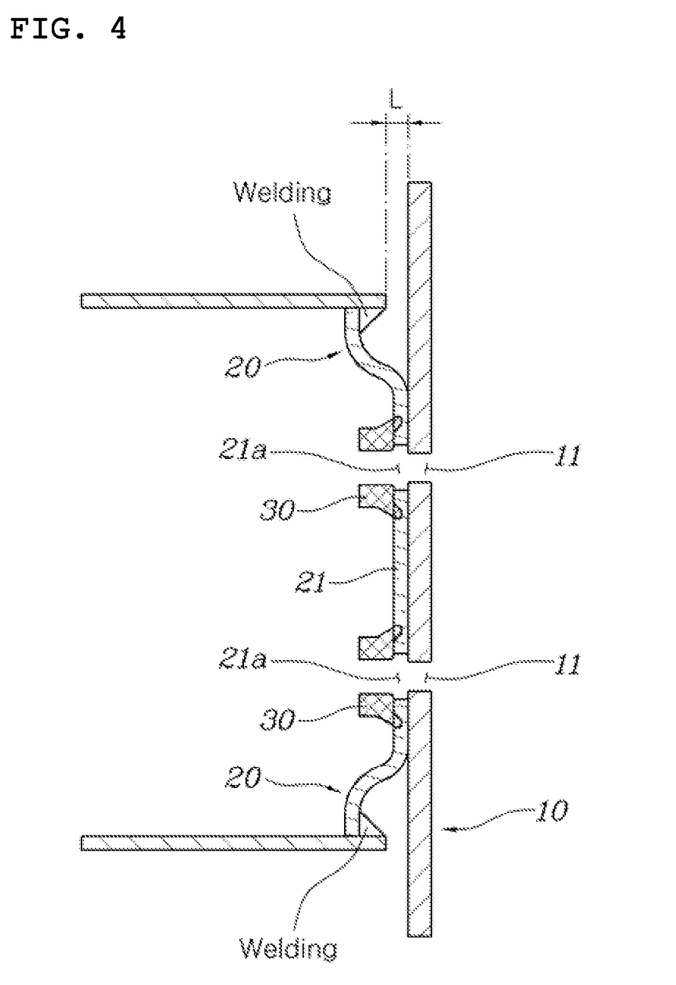
FIG. 4 is a cross-sectional view taken along line A-A of FIG. 3.
Figure 5:
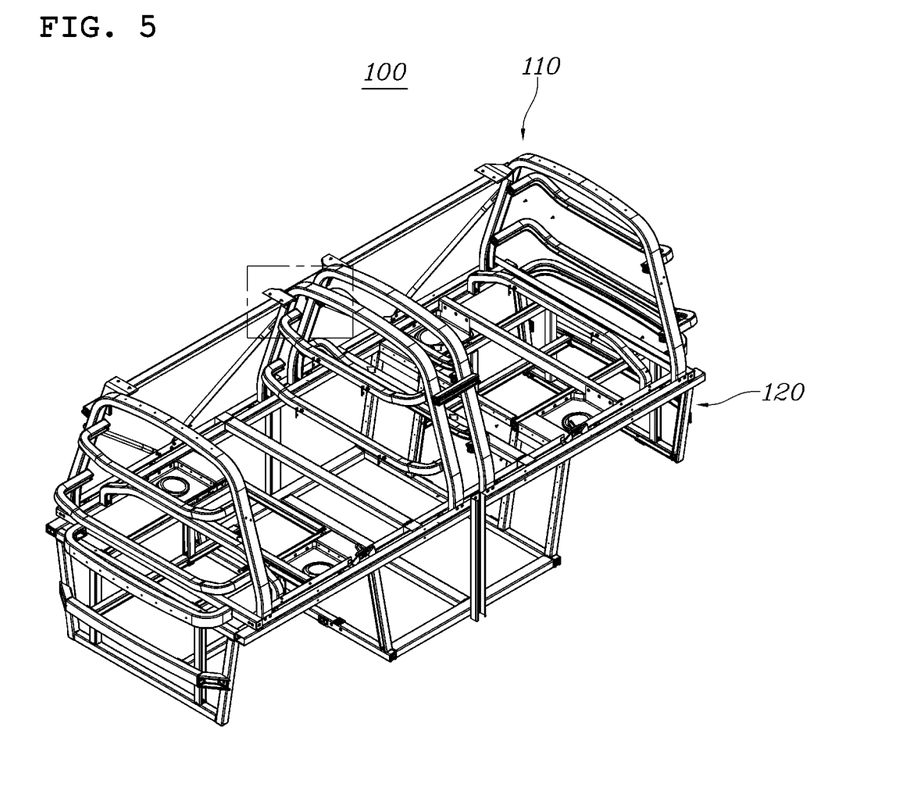
FIG. 5 is a perspective view of a chassis of a vehicle to which a vehicle truss member is applied according to an embodiment of the present disclosure.
Figure 6:
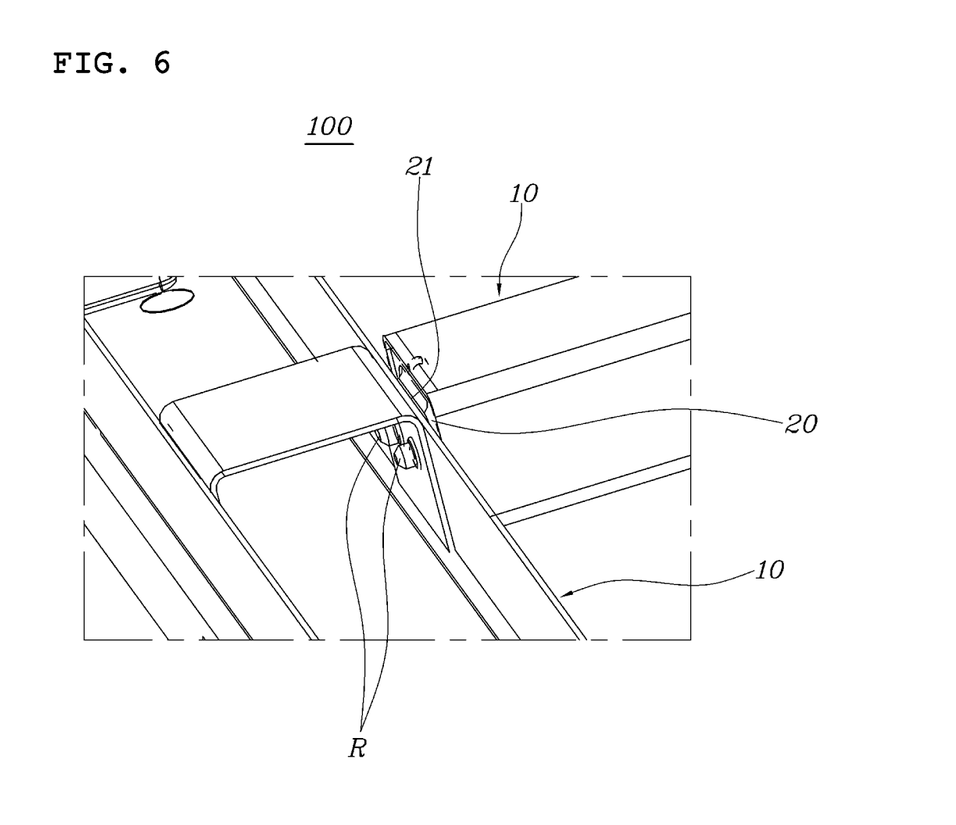
FIG. 6 is a perspective view of an end patch and an external element which are coupled to each other.
Figure 7:
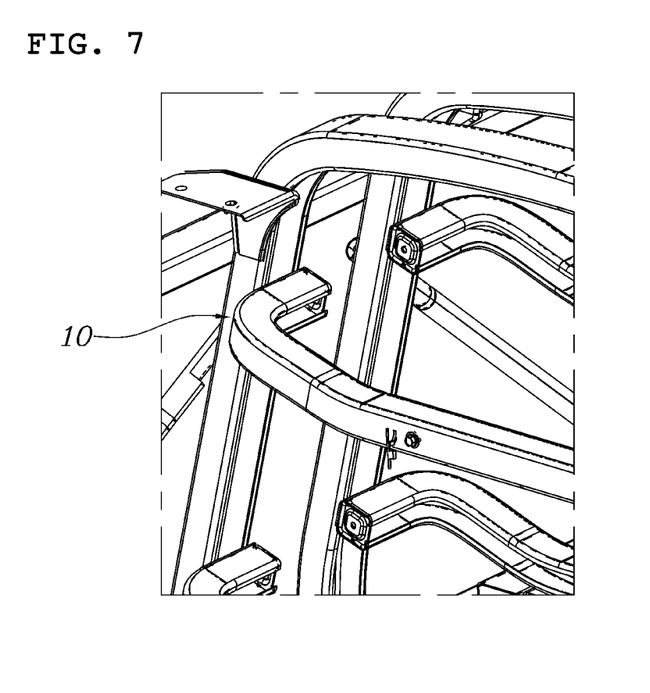
FIG. 7 is a perspective view of an end patch and an external element which are not coupled to each other.

FIG. 1 is a perspective view of a member body 10 and an end patch 20 of a vehicle truss member according to an embodiment of the present disclosure, FIG. 2 is an exploded perspective view of FIG. 1, FIG. 3 is an enlarged view of the end patch 20 of the vehicle truss member according to an embodiment of the present disclosure, FIG. 4 is a cross-sectional view taken along line A-A of FIG. 3, FIG. 5 is a perspective view of a chassis of a vehicle to which the vehicle truss member is applied according to an embodiment of the present disclosure, FIG. 6 is a perspective view of the end patch 20 and an external element which are coupled to each other, and FIG. 7 is a perspective view of the end patch 20 and an external element which are not coupled to each other.

A vehicle truss member according to embodiments of the present disclosure will be described with reference to FIGS. 1 to 7.

A vehicle truss member according to embodiments of the present disclosure, a plurality of which are connected to each other to form a chassis 100 having a vehicle truss structure, includes a member body 10 extending to have a pipe shape and having an end opened in the extension direction and an end patch 20 coupled to the open end of the member body 10 to close the end of the member body 10 and having a coupling pall 21 selectively fastened to an external element.

As illustrated in FIGS. 1 to 4, the member body 10 may extend in the longitudinal direction and be formed in a hollow pipe shape. An end of the member body 10 may be cut so that the end is opened.

The member body 10 may be formed to have a shape of a pipe having an open cross-section by roll forming a panel or may be formed as a pipe having a closed cross-section through extrusion molding, and an end thereof may be cut so that the end is opened. Through this, the manufacturing cost of the member body 10 can be reduced.

In addition, the end patch 20 may be coupled to the end of the member body 10 to close the open end of the member body 10 and may include a coupling pall 21 which is coupled to an external element to be coupled to the member body 10, and the coupling pall 21 may or may not be coupled to an external element as needed.

The coupling part 21 formed on the end patch 20 may be formed to easily couple an external element and the member body 10 to each other by mechanical coupling such as bolting or riveting, and the specific configuration of the coupling part 21 will be described later.

Accordingly, when the chassis 100 is configured using a pipe by applying embodiments of the present disclosure, the end patch 20 may couple an external element and the member body 10 to each other. In addition, even when the coupling is not established, the end patch 20 may be coupled to the member body 10 to close the end of the member body 10 so as to improve the rigidity of the member body 10. Through this, the autonomy in manufacturing the chassis 100 of a vehicle can be improved, and manufacturing of the chassis 100 of a vehicle can be simplified.

Further referring to FIGS. 6 to 7, as noted from FIG. 6, the end patch 20 and an external element are fastened to each other by bolting or riveting, and as noted from FIG. 7, the member body 10 is coupled to an external element while the end patch 20 is not coupled to the external element.

The external element may include all the elements constituting the chassis 100 of a vehicle. For example, the external element may be the member body 10 or include a panel of the chassis 100.

As shown in FIG. 5, the chassis 100 of a vehicle to which embodiments of the present disclosure are applied may include a lower body 120 having a lower portion coupled to a driving system and an upper body no having an upper portion on which a loading space for loading cargo is formed. A large part of the upper body no and the lower body 120 may be formed by coupling the member bodies 10 to which the end patches 20 are coupled to each other, and the respective lower body 120 and upper body no may also be coupled to each other to complete the chassis 100 of a vehicle.

The member body 10 may include a through-hole 11 formed therethrough in a direction intersecting with the member body 10 in order to be coupled to an external element, and the through-hole 11 may be connected to a coupling part 21 of another end patch 20.

As shown in FIG. 2, the through-hole 11 may be provided through a portion of the member body 10 extending in the longitudinal direction, and the member body can be easily coupled to an external element by mechanical coupling such as bolting or riveting through the through-hole 11.

In embodiments of the present disclosure, although the member body 10 is shown in a shape of a pipe having an open cross-section, the member body 10 may be manufactured in a shape of a pipe having a closed cross-section.

A bolt or a nut may be coupled to the through-hole 11 to be connected to the coupling part 21 of another end patch 20.

In order to more easily perform bolting or riveting with an external element through the through-hole 11, as shown in FIG. 2, a nut or bolt may be welded to the inside of the through-hole 11 to be matched with the through-hole 11 so as to form a weld nut 30 or a weld bolt (not shown).

When the weld nut 30 is coupled, the external element may be coupled to the weld nut 30 by rotating only a bolt from the outside, and when the weld bolt (not shown) is matched with the through-hole 11 to pass through the through-hole 11 and is coupled to the member body 10, the external element may be easily coupled by rotating only a nut from the outside.

Although only the weld nut 30 is shown in the drawings of embodiments of the present disclosure, a weld bolt (not shown) may be applied to the same position.

The edge of the end patch 20 may be coupled to the member body 10 by welding.

As shown in FIG. 3, the end patch 20 may be coupled to the end of the member body 10 by CO2 arc welding at a welding site to be firmly fixed thereto, and the modularized end patch 20 and the member body 10 joined by coupling may be moved to a smart factory and may be assembled by mechanical coupling such as bolting or riveting.

The CO2 arc welding raises concerns about disasters due to oxygen deficiency which may be caused by the large amount of sprayed CO2. Sufficient ventilation is required in the area where this welding is performed, and a manufacturing site licensed for welding is required since training on the risk of oxygen deficiency should be provided to workers and safety personnel should be placed in the workplace as necessary. The large quantities of the member body 10 and the end patch 20 may be coupled at the manufacturing site licensed for welding and may be moved to a smart factory to be completed as a vehicle through coupling.

An NVH element generated when a plurality of member bodies 10 are coupled to each other can be reduced when the end patch 20 is coupled to the member body 10 by welding, compared to the conventional method for forming the end patch 20 by folding the end of the member body 10.

The end patch 20 may be coupled to the member body 10 to be spaced inward from an end thereof, and a bead generated by the welding may be positioned in a distancing space formed by the end patch 20 being spaced toward the inside of the member body 10.

When the end patch 20 is welded by the CO2 arc welding, a band-shaped convex metal bead may be formed on the welded portion.

Conventionally, due to the bead, a step is formed when the member body 10 is coupled by bolting. To remove the step, a grinding operation was required to polish the surface of the bead by using a grinder.

However, in embodiments of the present disclosure, as shown in FIG. 3, the end patch 20 may be welded to be spaced toward the inside of the member body 10, and a bead may be positioned in the distancing space formed by the end patch 20 being spaced toward the inside of the member body 10, thereby dispensing with a grinding operation and shortening a working process. Accordingly, the manufacturing operation can be simplified, and the manufacturing costs can be reduced accordingly.

The coupling part 21 may protrude to the outside further than the end of the member body 10 and may be coupled to an external element to be in surface contact therewith.

As shown in FIG. 4, the coupling part 21 formed on the end patch 20 and coupled to an external element may be formed to protrude further than the end of the end patch 20, and the outer surface of the coupling part 21 may be in contact with an external element to be coupled thereto.

Accordingly, the outer surface of the coupling part 21 may be formed to be in surface contact with the member body 10 or an external element, thereby minimizing the load applied from the external element to the end patch 20.

In addition, by coupling an external element to the coupling part 21 of the end patch 20, the external element is not in contact with the member body 10, the load applied to the member body 10 can be minimized, and the joint generated between the external element and the member body 10 can be minimized.

In FIG. 4, an external element is shown as another member body 10, but the external element may be a panel and the like of a vehicle, rather than another member body, and the panel may be coupled to the coupling part 21 of the end patch 20.

The coupling part 21 may include a coupling hole 21a formed therethrough and may be coupled to an external element by bolting or riveting through the coupling hole 21a.

As shown in FIGS. 3 and 4, the coupling part 21 may have the coupling hole 21a formed therethrough and may be easily coupled to an external element by bolting or riveting through the coupling hole 21a.

As shown in FIG. 6, a rivet R passing through the through-hole 11 may be coupled to the member body 10 or a panel, which is an external element, to configure the chassis 100, and through this, the chassis 100 to which embodiments of the present disclosure are applied can be easily coupled in a smart factory.

A bolt, a nut, or a rivet may be welded to the coupling hole 21a to correspond thereto and may be coupled to an external element by bolting or riveting.

A bolt or a nut may be welded to the inner surface of the coupling part 21 in the same manner as for the weld nut 30 or weld bolt (not shown) coupled to the through-hole 11, and through this, the end patch 20 can be easily coupled to an external element.

When the weld nut 30 is coupled, an external element may be coupled to the weld nut 30 by rotating only a bolt from the outside, and when the weld bolt (not shown) is matched with the coupling hole 21a to pass through the coupling hole 21a and is coupled to the coupling part 21, the external element may be easily coupled by rotating only a nut from the outside.

The coupling part 21 protruding outward may protrude in a curved shape.

As shown in FIG. 4, the coupling part 21 may be formed to protrude in a curved shape when protruding to the outside of the member body 10.

Through this, the end patch 20 coupled to an external element through surface contact at the coupling part 21 may be under a load applied from the external element, and the area of the load applied from the outside can be maximized through the shape of the coupling part 21 protruding in a curved shape, thereby minimizing the damage of the end patch 20.

One side surface of the member body 10 may be opened in the longitudinal direction.

As shown in FIGS. 1 and 2, the member body 10 may be formed to have an open cross-section, and a tool used when the end patch 20 having the coupling hole 21a formed therethrough is coupled to an external element by bolting or riveting may be inserted thereinto. Through this, an operator can easily perform work.

In addition, a tool used when an external element and the member body 10 are coupled to each other by bolting or riveting through the coupling hole 21a and the through-hole 11 formed through the member body 10 may be inserted into the open side. Through this, an operator can easily perform work.

The end of an open portion of the member body 10 may protrude to surround the end patch 20.

As shown in FIGS. 1 to 3, when the member body 10 is formed to have an open cross-section, the end of the open side may be formed to protrude to surround the end patch 20.

The end patch 20 at the open side of the member body 10 may not be welded to the member body 10, and the open side of the member body 10 may lack coupling force. Accordingly, the load applied to the open side of the member body 10 when the end patch 20 is coupled to an external element may raise concerns about damage to the end patch 20.

In order to solve the concerns, the end of the open side of the member body 10 may protrude to surround the end patch 20, thereby improving the rigidity of the member body 10 and the end patch 20.

The member body 10 and the end patch 20 may be modularized and coupled and may be coupled to an external element by a mechanical coupling including bolts or rivets in a smart factory.

The end patch 20 and member body 10 according to embodiments of the present disclosure may be modularized to be completed in a space where welding can be performed, and may be transported to an eco-friendly smart factory where only mechanical coupling work including bolting or riveting is possible, to be completed as a frame of a vehicle by mechanical coupling including bolting or riveting. Accordingly, various type of vehicles can be manufactured to meet the needs of customers, and maintenance can be easily performed in case of vehicle damage or replacement of components.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle truss member comprising:
    a member body having a substantially C-shaped inner space having an open end, wherein the member body comprises a through-hole formed therethrough in a direction intersecting with the member body; and
    an end patch coupled to the open end of the member body, the end patch comprising a coupling part configured to be selectively coupled to an external element, wherein the member body is configured to be coupled to a second coupling part of a second end patch of a second vehicle truss member through a bolt or a nut coupled to the through-hole.

2. The vehicle truss member of claim 1, wherein the end patch is coupled to the open end of the member body by a weld spaced inward from the open end, and wherein a bead of the weld is positioned in a distancing space defined by the end patch being spaced inward from the open end.

3. The vehicle truss member of claim 1, wherein the coupling part protrudes outward further than the open end of the member body and is configured to be coupled to the external element in surface contact therewith.

4. The vehicle truss member of claim 1, wherein the coupling part comprises a coupling hole formed therethrough and is configured to be coupled to the external element by bolting or riveting through the coupling hole.

5. The vehicle truss member of claim 4, wherein a bolt, a nut, or a rivet is coupled by a weld to the coupling hole and is coupled to the external element by bolting or riveting.

6. The vehicle truss member of claim 1, wherein a side surface of the member body is opened in a longitudinal direction of the member body, and an end of an open portion of the member body protrudes to surround the end patch.

7. A chassis comprising:
   a plurality of vehicle truss members coupled together, each of the vehicle truss members comprising:
   a member body having a substantially C-shaped inner space having an open end, wherein the member body comprises a through-hole formed therethrough in a direction intersecting with the member body; and
   an end patch coupled to the open end of the member body, the end patch comprising a coupling part configured to be selectively coupled to another one of the plurality of vehicle truss members, wherein the member body is configured to be coupled to the coupling part of the end patch of the other one of the plurality of vehicle truss members through a bolt or a nut coupled to the through-hole.

8. The chassis of claim 7, wherein the end patch is coupled to the open end of the member body by a weld spaced inward from the open end, and wherein a bead of the weld is positioned in a distancing space defined by the end patch being spaced inward from the open end.

9. The chassis of claim 7, wherein the coupling part protrudes outward further than the open end of the member body and is configured to be coupled to the other one of the plurality of vehicle truss members in surface contact therewith.

10. The chassis of claim 7, wherein the coupling part comprises a coupling hole formed therethrough and is configured to be coupled to the other one of the plurality of vehicle truss members by bolting or riveting through the coupling hole.

11. The chassis of claim 10, wherein a bolt, a nut, or a rivet is coupled by a weld to the coupling hole and is coupled to the other one of the plurality of vehicle truss members by bolting or riveting.

12. The chassis of claim 7, wherein a side surface of the member body is opened in a longitudinal direction of the member body, and an end of an open portion of the member body protrudes to surround the end patch.

13. A method of forming a modularized vehicle truss member, the method comprising:
   forming a member body having a substantially C shaped inner space having an open end through extrusion or roll forming, the member body formed by forming a through-hole therethrough in a direction intersecting with the member body; and
   welding an end patch to the open end of the member body, the end patch comprising a coupling part for selectively coupling to an external element, wherein the member body is connectable to a second coupling part of a second end patch of a second vehicle truss member through a bolt or a nut coupled to the through-hole.

14. The method of claim 13, wherein welding the end patch to the open end of the member body comprises welding the end patch at a position spaced inward from the open end such that a bead of the weld is positioned in a distancing space defined by the end patch being welded at the position spaced inward from the open end.

15. The method of claim 13, wherein the coupling part protrudes outward further than the open end of the member body and is selectively coupled to the external element in surface contact therewith.

16. The method of claim 13, wherein the coupling part comprises a coupling hole formed therethrough and is selectively coupled to the external element by bolting or riveting through the coupling hole.

17. The method of claim 16, further comprising welding a bolt, a nut, or a rivet to the coupling hole, wherein the bolt, the nut, or the rivet is selectively coupled to the external element by bolting or riveting.

18. The vehicle truss member of claim 1, wherein the end patch is coupled to the open end of the member body by a weld spaced inward from the open end.

19. The vehicle truss member of claim 1, wherein the coupling part protrudes outward further than the open end of the member body.

20. The vehicle truss member of claim 1, wherein the coupling part comprises a coupling hole formed therethrough.

* * * * *